(12) United States Patent
Lu et al.

(10) Patent No.: US 11,238,190 B1
(45) Date of Patent: Feb. 1, 2022

(54) PHYSICAL DEVICE OPTIMIZATION WITH REDUCED COMPUTATIONAL LATENCY VIA LOW-RANK OBJECTIVES

(71) Applicant: X Development LLC, Mountain View, CA (US)

(72) Inventors: Jesse Lu, Hollister, CA (US); Brian Adolf, San Mateo, CA (US); Martin Schubert, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 400 days.

(21) Appl. No.: 16/392,430

(22) Filed: Apr. 23, 2019

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC ....... G06F 30/20; G06F 30/00; G06F 2111/10
See application file for complete search history.

(56) References Cited

U.S. PATENT DOCUMENTS

| | | | |
|---|---|---|---|
| 5,774,693 | A | 6/1998 | Hsu et al. |
| 6,772,076 | B2 | 8/2004 | Yamamoto et al. |
| 6,807,536 | B2 | 10/2004 | Achlioptas et al. |
| 6,807,636 | B2 | 10/2004 | Achlioptas et al. |
| 8,463,073 | B2 | 6/2013 | Ma et al. |
| 8,774,558 | B2 | 7/2014 | Zhang et al. |
| 9,400,955 | B2 | 7/2016 | Garimella |
| 9,589,757 | B1 | 3/2017 | Hannon et al. |
| 2004/0225483 | A1 | 11/2004 | Okoniewski et al. |

(Continued)

FOREIGN PATENT DOCUMENTS

| | | |
|---|---|---|
| WO | 2017/176370 A1 | 10/2017 |
| WO | 2017/223560 A1 | 12/2017 |

OTHER PUBLICATIONS

Key, Kerry. "MARE2DEM: a 2-D inversion code for controlled-source electromagnetic and magnetotelluric data." Geophysical Journal International 207.1 (2016): 571-588. (Year: 2016).*

(Continued)

*Primary Examiner* — Boris Gorney
*Assistant Examiner* — Joshua E. Jensen
(74) *Attorney, Agent, or Firm* — Christensen O'Connor Johnson Kindness PLLC

(57) ABSTRACT

A method and system for optimizing structural parameters of a physical device is described. The method includes receiving an initial description of the physical device that describes structural parameters of the physical device within a simulated environment. The method further includes performing an operational simulation of the physical device in response to an excitation source, performing an adjoint simulation by backpropagating a placeholder metric through a simulated environment to determine a loss gradient, updating the loss gradient based, at least in part, on a loss metric determined from the operational simulation. Additionally, the method further comprises computing a structural gradient corresponding to an influence of changes in the structural parameters on the loss metric and generating a revised description of the physical device by updating the structural parameters based on the structural gradient to reduce the loss metric.

24 Claims, 7 Drawing Sheets

(56) References Cited

U.S. PATENT DOCUMENTS

| | | | |
|---|---|---|---|
| 2010/0312539 | A1 | 12/2010 | Yamagajo et al. |
| 2014/0365188 | A1 | 12/2014 | Doerr |
| 2016/0012176 | A1 | 1/2016 | Liu et al. |
| 2016/0033765 | A1 | 2/2016 | Liu et al. |
| 2016/0174902 | A1 | 6/2016 | Georgescu et al. |
| 2018/0018757 | A1 | 1/2018 | Suzuki |
| 2018/0045953 | A1* | 2/2018 | Fan .................. G02B 5/18 |
| 2018/0240011 | A1* | 8/2018 | Tan .................. G06N 3/084 |
| 2019/0073586 | A1* | 3/2019 | Chen .................. G06N 7/005 |
| 2019/0279094 | A1* | 9/2019 | Baughman .......... G06N 3/0472 |
| 2020/0174840 | A1* | 6/2020 | Zhao .................. G06N 3/084 |

OTHER PUBLICATIONS

Chen, R.T. et al., "Neural Ordinary Differential Equations", 32nd Conference on Neural Information Processing Systems (NIPS 2018), Oct. 22, 2018, 18 pages.

Petykiewicz, J. et al., "Active Nanophotonics: Inverse Design and Strained Germanium Light Emitters", A Dissertation Submitted to the Department of Electrical Engineering and the Committee on Graduate Studies of Stanford University, Oct. 2016. 134 pages.

King-Shou Lu, J., "Nanophotonic Computational Design", A Dissertation Submitted to the Department of Electrical Engineering and the Committee on Graduate Studies of Stanford University, Jun. 2013, 122 pages.

Piggott, A.Y., "Automated Design of Photonic Devices", A Dissertation Submitted to the Department of Electrical Engineering and the Committee on Graduate Studies of Stanford University, Jun. 2018, 112 pages.

Lu, J. et al., "Nanophotonic Computational Design", Optics Express, vol. 21, No. 11, Jun. 3, 2013, 17 pages.

Piggott, A. Y. et al., "Inverse Design and Implementation of a Wavelength Demultiplexing Grating Coupler", Scientific Reports, Nov. 27, 2014, 5 pages.

Piggott, A.Y. et al., "Inverse Design and Demonstration of a Compact and Broadband On-Chip Wavelength Demultiplexer", Nature Photonics, May 11, 2015, 5 pages.

Piggott, A.Y. et al., "Silicon Photonics: Design Approach to Integrated Photonics Explores Entire Space of Fabricable Devices", Laser Focus World, Aug. 13, 2018, 5 pages.

Piggott, A. Y. et al., "Fabrication-constrained Nanophotonic Inverse Design", Scientific Reports, May 11, 2017, 7 pages.

Su, L. et al., "Inverse Design and Demonstration of a Concept On-Chip Narrowband Three-Channel Wavelength Demultiplexer", ACS Photonics, Aug. 17, 2017, 6 pages.

Su, L. et al., Fully-Automated Optimization of Grating Couplers, Optics Express, vol. 26, No. 4m Feb. 2018, 12 pages.

Robinson, J.T., "First-Principle Derivation of Gain in High-Index-Contrast Waveguides", Optics Express, vol. 16, No. 21, Oct. 13, 2008, 11 pages.

Lalau-Keraly, C.M. et al., "Adjoint Shape Optimization Applied to Electromagnetic Design", Optical Society of America, 2013, 9 pages.

Taira, K. "Modal Analysis of Fluid Flows: An Overview", AIAA Journal, vol. 55, No. 12, Dec. 2017, 29 pages.

Gross, D., "Recovering Low-Rank Matrices From Few Coefficients in Any Basis", IEEE Transactions on Information Theory, vol. 57, Issue: 3 , Mar. 2011, 19 pages.

Grussler, C. et al., "Low-Rank Optimization with Convex Constraints", IEEE Transactions on Automatic Control, Mar. 7, 2018, 17 pages.

Zhu, Z. et al., "Global Optimality in Low-rank Matrix Optimization", IEEE Transactions on Signal Processing vol. 66, Issue 13, Jul. 2018, 14 pages.

Qin, C. et al., "Dot-Product Join: An Array-Relation Join Operator for Big Model Analytics", arXiv: 1602.08845, Jan. 2017, 22 pages.

Shapira, O. et al., Complete Modal Decomposition for Optical Waveguides, Physical Review Letters vol. 94, 2005, 4 pages.

Roughgarden, T. et al., "CS168: The Modern Algorithmic Toolbox Lecture #9: The Singular Value Decomposition (SVD) and Low-Rank Matrix Approximations", Retrieved from Internet: <http://theory.stanford.edu/~tim/s15/I/l9.pdf>, Apr. 27, 2015, 10 pages.

Sainath, T.N. et al., "Low-Rank Matrix Factorization for Deep Neural Network Training With High-Dimensional Output Targets", 2013 IEEE International Conference on Acoustics, Speech and Signal Processing, May 2013, 5 pages.

Dahleh, M. et al., "Lectures on Dynamic Systems and Control", Retrieved from Internet: <http://ocw.ateneo.net/courses/electrical-engineering-and-computer-science/6-241j-dynamic-systems-and-control-spring-2011/readings/MIT6_241JS11_chap02.pdf>, 2011, 12 pages.

"Overlap", lumerical, Retrieved from Internet: <https://kb.lumerical.com/ref_scripts_overlap.html> Nov. 28, 2018, 2 pages.

Domon, P. et al., "Sparse Representations and Low-Rank Tensor Approximation", HAL acrchives-ouvertes, 2011, 19 pages.

Kressner, D., "Low-Rank Tensor Techniques for High-Dimensional Problems", arXiv.org > math > arXiv:1511.01554, Nov. 2015, 121 pages.

Udell, M., Generalized Low Rank Models, Foundations and Trends in Machine Learning, vol. 9, No. 1, 2016, 122 pages.

Gorodetsky, D.A., "Reduction of FDTD Simulation Time with Modal Methods", Progress in Electromagnetics Research, Mar. 2006, 4 pages.

Tensors, Retrieved from Internet <https://www.tensorflow.org/guide/tensors> Dec. 18, 2018, 9 pages.

\* cited by examiner

US 11,238,190 B1

PHYSICAL DEVICE OPTIMIZATION WITH REDUCED COMPUTATIONAL LATENCY VIA LOW-RANK OBJECTIVES

TECHNICAL FIELD

This disclosure relates generally to design tools, and in particular but not exclusively, relates to design tools for optical and electromagnetic devices.

BACKGROUND INFORMATION

Electromagnetic devices (e.g., optical devices, electrical devices, or otherwise) are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Conventional techniques for the design of these devices are sometimes determined through a simple guess and check method in which a small number of design parameters of a predetermined design are adjusted for suitability to a particular application. However, in actuality, these devices may have design parameters ranging from hundreds all the way to many billions, dependent on the device size and functionality. As functionality of electromagnetic devices is increased and manufacturing tolerances improve to allow for smaller device feature sizes, it becomes increasingly important to take full advantage of these improvements via optimized device design.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
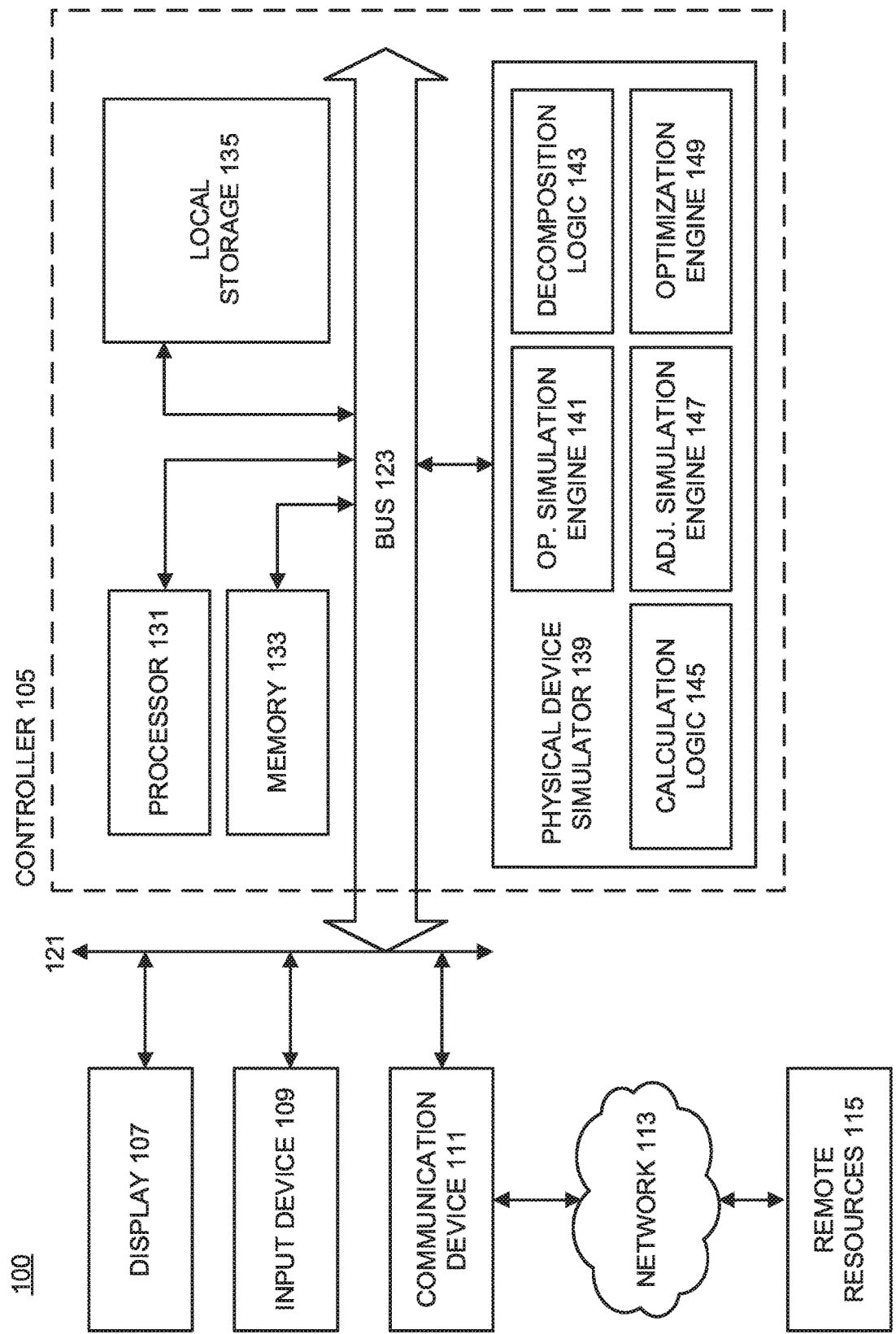
FIG. 1 is a functional block diagram illustrating a system for optimizing structural parameters of a physical device with reduced computational latency, in accordance with an embodiment of the present disclosure.

Embodiments of an apparatus, system, and method for physical device optimization with reduced computational latency via low-rank objectives as described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein are embodiments of a physics simulator that may be utilized to optimize structural parameters of physical devices (e.g., electromagnetic devices) based on first-principles simulations. In particular, the physics simulator allows for a first-principles based design and optimization of devices based on their optical, electrical, magnetic, acoustic, and/or fluidic response (e.g., field response) to an excitation source. The physics simulator utilizes physical partial-differential equation (PDE) systems to model these optical, electrical, mechanical, fluidic, quantum dynamic, and the like systems within a simulated environment to perform operational and adjoint simulations of a physical device. The operational simulation simulates the field response of the simulated environment, including the physical device, to an excitation source to determine a performance metric of the physical device. The adjoint simulation backpropagates a loss metric (e.g., through a loss function) tied to the performance metric within the simulated environment to determine the influence of structural parameters of the physical device on the loss metric (e.g., structural gradient). However, the large state sizes (e.g., from the physical device being represented in three-dimensions, or other dimensionality, by a quantity of voxels ranging from hundreds all the way to many billions) and simulation time steps (e.g., from hundreds to millions or billions of time steps) necessary to perform the operational and adjoint simulations of the physical device using PDE systems may be intractable in terms of memory footprint and have increased computational time cost (e.g., latency).

In some embodiments, the operational simulation is followed by the adjoint simulation due to the adjoint simulation being tied to the loss metric determined from the operational simulation. However, described herein, are embodiments of an apparatus, system, and method in which the operational simulation and adjoint simulations are able to be performed substantially in parallel to reduce the computational latency for optimization of a physical device. More specifically, through the use of low-rank objectives in optimization problems (e.g., to optimize a design of a physical device) the computational burden is reduced (e.g., via increased parallelism). In some embodiments, the low-rank objectives correspond to the form of a dot-product on top of the solution to the field response (e.g., PDE fields). Advantageously, this form of an optimization problem allows for premature backpropagation (e.g., for the adjoint simulation) of the gradients (e.g., the loss gradient) substantially in parallel with the forward pass (e.g., the operational simulation), which allows for the latency of the training operation (e.g., combined operational simulation, adjoint simulation, and updating structural parameters) to potentially be reduced by 50%. Specifically, this allows for simultaneous execution of the forward (e.g., operational simulation) and backward (e.g., adjoint simulation) passes. The backward pass may subsequently be updated by a correction term in the form of a scaling factor (e.g., based, at least in part, on the loss metric), which is determined upon completion of the forward pass. In some embodiments, the linearity of the PDE systems used to simulate the underlying physics governing the operation of the physical device makes the simultaneous execution possible.

As mentioned above, the physics simulator allows for first-principles based design of novel devices with a reduced computational time cost (e.g., latency) by enabling increased parallelism through low-rank objectives. This has applications in a wide variety of fields, including but not limited to, mechanical devices, optical devices, electromagnetic devices, quantum-dynamic devices, lasers, lenses, mechanical structures, transistors, and the like. Advantageously, this first-principles based design is not dependent on human intuition or expertise and generally may result in designs which outstrip current state-of-the-art designs as simultaneous, scalable optimization of a nearly unlimited number of design parameters may be achieved.

It is further appreciated that the techniques described in the embodiments disclosed herein may be performed within a computational domain for simulating a physical device residing within a simulated (e.g., virtual) environment. More specifically, the term "physical" device is utilized to emphasize to the reader of the disclosure that the techniques described herein may be used for simulating performance of a physical device within a simulated environment (e.g., within a computational domain) to generate, update, configure, or otherwise optimize designs of a physical device that may ultimately be fabricated for application or use within a physical domain. The techniques described herein leverage an "inverse design" approach for determining a relationship between the design (e.g., structural parameters) of the physical device and performance of the physical device (e.g., performance metric) via simulation of the underlying physics that are expected to govern how the physical device operates or may otherwise perform within the physical domain.

FIG. 1 is a functional block diagram illustrating system 100 for optimizing structural parameters of a physical device with reduced computational latency, in accordance with an embodiment of the present disclosure. In the following embodiments, the system 100 will be described in the context of an optical waveguide as corresponding to the physical device. However, it is appreciated that the physical device is not limited to optical waveguides, and that other devices such electromagnetic devices (e.g., acousto-optic modulators, optical modulators, optical couplers, optical ring resonators, distributed Bragg reflectors, lasers, lenses, transistors, waveguides, antennas, optoelectronic switches, grating couplers, and the like), mechanical structures, and the like may be represented by the term "physical device." More specifically, system 100 provides first-principles based design and optimization of devices based on their optical, electrical, magnetic, acoustic, and/or fluidic response (e.g., field response) to an excitation source. In other words, it is appreciated that the system 100 is not limited to modeling operation of optical waveguides, and that other devices having a field response to an excitation source may also be modeled and subsequently have structural parameters optimized.

As illustrated, system 100 includes controller 105, display 107, input device(s) 109, communication device(s) 111, network 113, remote resources 115, bus 121 and bus 123. Controller 105 includes processor 131, memory 133, local storage 135, and physical device simulator 139. Physical device simulator 139 includes simulation engine 141, decomposition logic 143, calculation logic 145, adjoint simulation engine 147, and optimization engine 149. It is appreciated that in some embodiments, controller 105 may be a distributed system.

Controller 105 is coupled to display 107 (e.g., a light emitting diode display, a liquid crystal display, and the like) coupled to bus 121 through bus 123 for displaying information to a user utilizing system 100 to optimize structural parameters of the electromagnetic device. Input device 109 is coupled to bus 121 through bus 123 for communicating information and command selections to processor 131. Input device 109 may include a mouse, trackball, keyboard, stylus, or other computer peripheral, to facilitate an interaction between the user and controller 105. In response, controller 105 may provide verification of the interaction through display 107.

Another device, which may optionally be coupled to controller 105, is a communication device 111 for accessing remote resources 115 of a distributed system via network 113. Communication device 111 may include any of a number of networking peripheral devices such as those used for coupling to an Ethernet, Internet, or wide area network, and the like. Communication device 111 may further include a mechanism that provides connectivity between controller 105 and the outside world. Note that any or all of the components of system 100 illustrated in FIG. 1 and associated hardware may be used in various embodiments of the present disclosure. The remote resources 115 may be part of a distributed system and include any number of processors, memory, and other resources for optimizing the structural parameters of the physical device with a reduced computational latency.

Controller 105 orchestrates operation of system 100 for optimizing structural parameters of the physical device. Processor 131 (e.g., one or more central processing units, graphics processing units, and/or tensor processing units, etc.), memory 133 (e.g., volatile memory such as DRAM and SRAM, non-volatile memory such as ROM, flash memory, and the like), local storage 135 (e.g., magnetic memory such as computer disk drives), and the physical device simulator 139 are coupled to each other through bus 123. Controller 105 includes software (e.g., instructions included in memory 133 coupled to processor 131) and/or hardware logic (e.g., application specific integrated circuits, field-programmable gate arrays, and the like) that when executed by controller 105 causes controller 105 or system 100 to perform operations. The operations may be based on instructions stored within any one of, or a combination of, memory 133, local storage 135, physical device simulator 139, and remote resources 115 accessed through network 113.

In the illustrated embodiment, the modules 141-149 of the physical device simulator 139 are utilized to optimize the structural parameters of the physical device (e.g., an optical waveguide) with reduced computational latency. In some embodiments, system 100 may optimize structural parameters of the physical device via, inter alia, simulations (e.g., operational and adjoint simulations) that utilize a finite-difference time-domain (FDTD) method to model the field response (e.g., electric and magnetic fields when the physical device is an electromagnetic device). The operational simulation engine 141 provides instructions for performing a simulation of the physical device operating in response to an excitation source within a simulated environment. In particular, the operational simulation is determines a field response of the simulated environment (e.g., electric/magnetic field vector values in one or more orthogonal directions for each of a plurality of voxels). The simulated environment includes the plurality of voxels, a portion of which, describe the physical device (e.g., based off an initial description or input design of the physical device that describes the structural parameters of the physical device within the simulated environment via the plurality of voxels). The structural parameters may correspond, for example, to the specific design, material compositions, dimensions, and the like of the physical device. The field response of the simulated environment is determined for a plurality of time steps during the operational simulation (e.g., from an initial time step to a final time step corresponding to when the field response reaches a substantially steady state, decrease to negligible values, or the operational simulation otherwise concludes) to determine a field gradient (e.g., how changes in the structural parameters influence/change the field response). Additionally, the operational simulation may determine a performance metric (e.g., output power at a particular region within the simulated environment) of the physical device in response to the excitation source once the field response reaches a substantially steady state or the operational simulation otherwise concludes. Decomposition logic 143 facilitates the performance of a variety of tasks, such as extracting decomposition components from the field response to reduce a dimensionality of the field response, performing overlap integrals with respect to the field response, modal decomposition of the field response, low-rank approximation of the field response, and the like. In other words, decomposition logic 143 includes instructions for reducing the computational burden of the simulation due to the large state sizes (e.g., caused by the number of voxels and/or time steps). Calculation logic 145 computes a loss metric of the physical device based, at least in part, on the performance metric of the physical device. In one embodiment, the loss metric is associated with a difference between the performance metric and a target performance metric. In one or more embodiments, the performance metric is tied to the field response (e.g., at the final time step included in the plurality of time steps) within a particular region of the simulated environment (e.g., one or more regions corresponding to output ports of the optical waveguide), which may be input into a loss function to determine the loss metric. In some embodiments, calculation logic 145 may also be utilized for updating a loss gradient determined from the adjoint simulation based, at least in part, on the loss metric. Additionally, in the same or other embodiments, calculation logic 145 may be used in conjunction with decomposition logic 143 to update the loss gradient based on low-rank objectives (e.g., a low rank approximation of the field response). In one embodiment, calculation logic 145 is also utilized to determine a structural gradient (e.g., how changes in the structural parameters influence or change the loss metric) based, at least in part, on the field gradient and loss gradient. Adjoint simulation engine 147 is utilized to backpropagate a placeholder metric (i.e., a placeholder value standing in for a yet to be determined loss metric) through the simulated environment to determine the loss gradient (e.g., how changes in the field response influence/change the loss metric). Advantageously, by utilizing a placeholder metric the operational and adjoint simulations may be performed substantially in parallel to reduce computational latency. Optimization logic 149 is utilized to update the structural parameters of the physical device to reduce the loss metric and generate a revised description of the physical device.

Figure 2A:
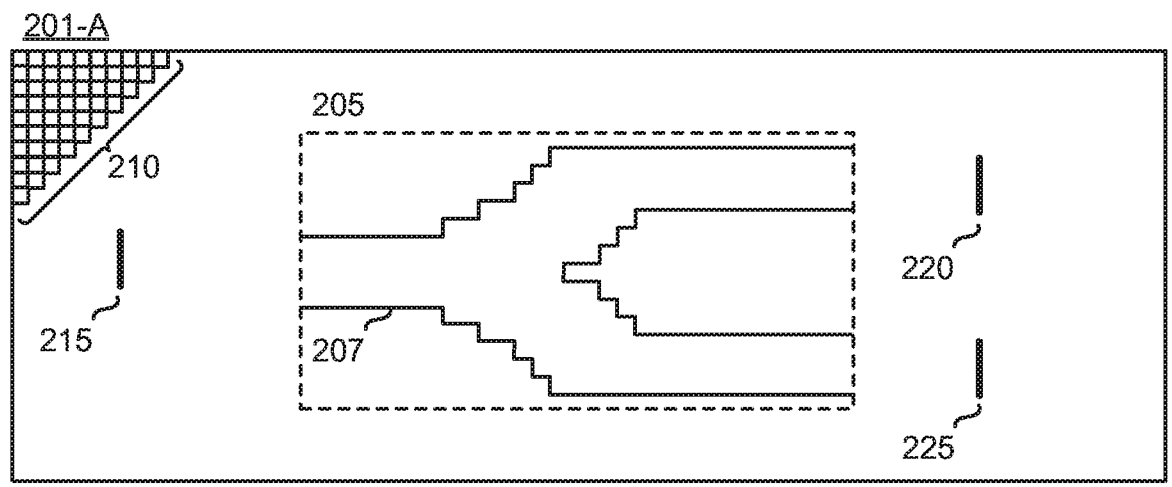
FIG. 2A illustrates a demonstrative simulated environment describing a physical device, in accordance with an embodiment of the present disclosure.
Figure 2B:
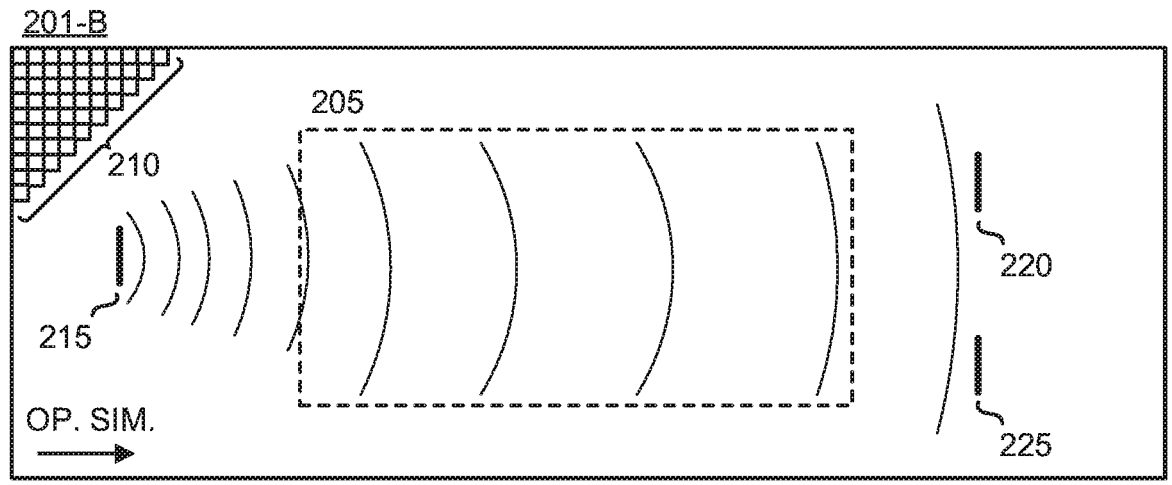
FIG. 2B illustrates an example operational simulation of the physical device in response to an excitation source within a simulated environment, in accordance with an embodiment of the present disclosure.
Figure 2C:
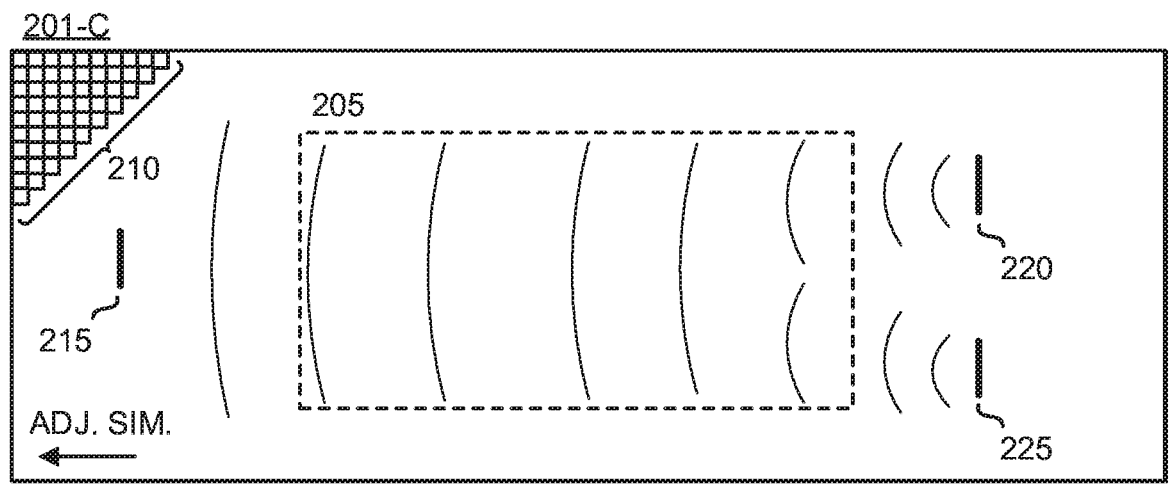
FIG. 2C illustrates an example adjoint simulation within the simulated environment by backpropagating a metric, in accordance with an embodiment of the present disclosure.

FIGS. 2A-2C respectively illustrate an initial set up of a simulated environment 201-A describing a physical device, performing an operational simulation of the physical device operating in response to an excitation source within the simulated environment 201-B, and performing an adjoint simulation of the physical device within the simulated environment 201-C. The initial set up of the simulated environment 201, operational simulation of the physical device, and adjoint simulation of the physical device may be implemented with system 100 illustrated in FIG. 1. As illustrated in FIGS. 2A-2C, simulated environment 201 is represented in two-dimensions. However, it is appreciated that higher (e.g., 3-dimensional space) and lower (e.g., 1-dimensional space) dimensionality may also be used to describe simulated environment 201 and the physical device. In some embodiments, optimization of structural parameters of the physical device illustrated in FIGS. 2A-2C may be achieved via, inter alia, simulations (e.g. operational and adjoint simulations) that utilize a finite-difference time-domain (FDTD) method to model the field response (e.g., electric and magnetic field) to an excitation source.

FIG. 2A illustrates a demonstrative simulated environment 201-A describing an optical waveguide (i.e., a physical device), in accordance with an embodiment of the present disclosure. More specifically, in response to receiving an initial description of a physical device defined by one or more structural parameters (e.g., an input design), a system (e.g., system 100 of FIG. 1) configures a simulated environment 201 to be representative of the physical device. As illustrated, the simulated environment 201 (and subsequently the physical device) is described by a plurality of voxels 210, which represent individual elements (i.e., discretized) of the two-dimensional (or other dimensionality) space. Each of the voxels 210 is illustrated as two-dimensional squares. However, it is appreciated that in other embodiments the voxels may be represented with different dimensionality or shape, which may be dependent on the underlying dimensionality of simulated environment 201 and/or the physical device. In one embodiment, simulated environment 201 is described within three-dimensional space to optimize a physical device having a three-dimensional structure. In the same embodiment, the plurality of voxels 210 may be represented as cubes or other shapes in three-dimensional space. Thus, it is appreciated that the specific shape and dimensionality of the plurality of voxels 210 may be adjusted dependent on simulated environment 201 and the physical device being simulated. It is further noted that only a portion of the plurality of voxels 210 are illustrated to avoid obscuring other aspects of simulated environment 201.

Each of the plurality of voxels 210 may be associated with a structural value, a field value, and a source value. Collectively, the structural values of the simulated environment 201 describe the structural parameters of the physical device. In one embodiment, the structural values may correspond to a relative permittivity, permeability, and/or refractive index that collectively describe structural (i.e., material) boundaries of the physical device. For example, interface 207 is representative of where relative permittivity changes within the simulated environment 201 and may define a boundary of the physical device where a first material meets or otherwise interfaces with a second material. The field values of the plurality of voxels describe the field (or loss) response that is calculated (e.g., via Maxwell's equations) in response to an excitation source described by the source value(s). The field response, for example, may correspond to a collection of vectors (i.e., a tensor) describing the electric and/or magnetic fields (e.g., in one or more orthogonal directions) at a particular time step for each of the plurality of voxels 210. More specifically, individual vectors may correspond to a Yee lattice to discretize Maxwell's equations for determining the field response. Maxwell's equations and the FDTD operations may take into account the structural parameters and excitation source for determining the field response.

In the illustrated embodiment, the physical device corresponds to an optical waveguide having a design region 205, in which structural parameters of the physical device may be updated. The simulated environment 201 may include an input port 215 of the physical device corresponding to a location of an excitation source to provide an output (e.g., a Gaussian pulse, a wave, a waveguide mode response, and the like). The output of the excitation source originates at the input port and is positioned to propagate (or otherwise influence the field values of the plurality of voxels via reflection, refraction, diffraction, scattering, absorbing, and the like) within the simulated environment 201 (e.g., through the design region 205 towards output ports 220 and 225 of the physical device). In the illustrated embodiment, the input port 215 and output ports 220 and 225 are positioned outside of the design region 205. In other words, in the illustrated embodiment, only a portion of the structural parameters of the physical device is optimizable. However, in other embodiments, the entirety of the physical device may be placed within the design region 205 such that the structural parameters may represent any portion or the entirety of the design of the physical device. The electric and magnetic fields within the simulated environment 201 (and subsequently the physical device) may change (e.g., represented by field values of the individual voxels that collectively correspond to the field response of the simulated environment 201) in response to the excitation source. The output ports 220 and 225 of the optical waveguide may be used for determining a performance metric of the physical device in response to the excitation source (e.g., power, waveguide mode, etc.). The initial description of the physical device, including initial structural parameters, excitation source, performance parameters or metrics, and other parameters describing the physical device, are received by the system (e.g., system 100 of FIG. 1) and used to configure the simulated environment 201 for performing a first-principles based simulation of the physical device. These specific initial values and parameters may be defined directly by a user (e.g., of system 100 in FIG. 1), indirectly (e.g., via controller 105 culling pre-determined values stored in memory 133, local storage 135, or remote resources 115), or a combination thereof.

FIG. 2B illustrates an operational simulation of the physical device in response to an excitation source within simulated environment 201-B, in accordance with an embodiment of the present disclosure. In the illustrated embodiment, the physical device is an optical waveguide operating at one or more frequencies of interest and having one or more particular waveguide modes (e.g., transverse electric mode, transverse magnetic mode, or transverse electric and magnetic mode). The excitation source is at an input of the optical waveguide (e.g., input port 215) having a specified spatial, phase, and/or temporal profile. The operational simulation occurs over a plurality of time steps, including the illustrated time step. When performing the operational simulation, changes to the field response (e.g., the field value) for each of the plurality of voxels 210 are incrementally updated in response to the excitation source over the plurality of time steps. The changes in the field response at a particular time step are based, at least in part, on the structural parameters, the excitation source, and the field response of the simulated environment at the immediately prior time step included in the plurality of time steps. Similarly, in some embodiments the source value of the plurality of voxels is updated (e.g., based on the spatial profile and/or temporal profile describing the output of the excitation source). It is appreciated that the operational simulation is incremental and that the field values (and source values) of the simulated environment 201 are updated incrementally at each time step as time moves forward for each of the plurality of time steps during the operational simulation. It is further noted that in some embodiments, the update is an iterative process and that the update of each field and source value is based, at least in part, on the previous update of each field and source value.

Once the operational simulation reaches a steady state (e.g., changes to the field values in response to the excitation source substantially stabilize) or otherwise concludes, one or more performance metrics may be determined. In some embodiments, the excitation source of the operational simulation may comprise a pulse. In such a scenario, the operational simulation may conclude once the intensity of the pulse has substantially dissipated. In other embodiments, the performance metric may be ascertained without waiting for the excitation source to dissipate. In the same or other embodiments the operational simulation may be considered to have reached a steady state once the field values reach a null value. In one embodiment, the performance metric corresponds to the output mode of the optical waveguide at output ports 220 and 225. In the same or other embodiments, the performance metric represents power (at one or more frequencies of interest) in the target mode shape at the specific locations of the output ports 220 and 225. A loss metric of the input design (e.g., the initial design and/or any refined design in which the structural parameters have been updated) based, at least in part, on the performance metric may be determined. The loss metric, in conjunction with an adjoint simulation, may be utilized to determine a structural gradient (e.g., influence of structural parameters on loss metric) for updating or otherwise revising the structural parameters to reduce the loss metric (e.g., increase performance metric). Additionally, the operational simulation may be utilized to determine the field gradient (e.g., the influence of the structural parameters on the field response), which is combined in the appropriate way with the loss gradient to determine the structural gradient.

It is appreciated that in some embodiments, storing the field response and/or field gradient of the plurality of voxels 210 may be intractable due to the large state size (e.g., due to the number of voxels within the simulated environment and/or number of time steps within the plurality of time steps of the operational simulation). To reduce the computational burden the field response and/or loss gradient may be stored in a reduced dimensionality (e.g., compressed) form, rather than storing each and every specific value. In some embodiments the reduced dimensionality may correspond to modal decomposition of the fields into an arbitrary or pre-determined number of output modes of interest. In the same or other embodiments, the field response (or loss gradient) may be reduced in dimensionality via low rank objectives, such as a low rank approximation (e.g., via singular value decomposition), in which a matrix or tensor representative of the field response at the plurality of time steps is stored in a reduced form as a combination (i.e., multiplication) of orthogonal low rank matrices. In the same or other embodiments, an overlap integral of the field response may be taken at each of the plurality of time steps during the operational simulation to decompose the field response by representing the field response as a scalar for each of the plurality of time steps in one or more modes of interest.

FIG. 2C illustrates an example adjoint simulation within simulated environment 201-C by backpropagating a metric (e.g., a placeholder metric or the loss metric), in accordance with an embodiment of the present disclosure. More specifically, the adjoint simulation is performed substantially in parallel with the operational simulation, which in combination, is used to determine a structural gradient based on a pre-determined loss function. In other words, the structural gradient is indicative of how changes in the structural parameters of the physical device influence the loss metric. It is noted that the loss function is selected to incorporate the reduced representation of the field response such that the adjoint simulation may be performed in parallel with the operational simulation. The adjoint simulation is performed by backpropagating a placeholder metric (e.g., a stand-in for the loss metric, which is unknown since the operational simulation is being performed in parallel) through the simulated environment. The placeholder metric may be pre-determined before the completion (or even before the start of) the operational simulation and may correspond to a random value, a guess (e.g., based on the loss metric from a previous simulation from the optimization process), or a set value (e.g., a unitary value), which may be a stand-in or placeholder value for the loss metric or representation thereof (e.g., an initial starting value for the backpropagation). The placeholder metric is backpropagated in reverse (e.g., from later to earlier time steps) through the simulated environment. In other words, an adjoint (or virtual source) based on the placeholder metric is placed at the waveguide output ports 220 and 225 that correspond to a location for determining the performance metric. The adjoint source(s) is then treated as an excitation source during the adjoint simulation. A loss response of the simulated environment 201 is computed for each of the plurality of time steps (e.g., backwards in time) in response to the adjoint source. The loss response collectively refers to loss values of the plurality of voxels that are incrementally updated in response to the adjoint source over the plurality of time steps. The change in loss response based on the placeholder metric may correspond to a (interim) loss gradient that may be updated after the loss metric is determined from the operational simulation. More specifically, the loss gradient is updated based, at least in part, on the loss metric determined from the operational simulation. The updated loss gradient and the field gradient may be combined in the appropriate way to determine the structural gradient of the physical device/ simulated environment (e.g., how changes in the structural parameters of the physical device within the simulated environment influence the loss metric). Once the structural gradient of a particular cycle (e.g., operational and adjoint simulation) is known, the structural parameters may be updated to reduce the loss metric and generate a revised description of the physical device.

It is appreciated that in some embodiments, the operational simulation may include multiple output modes, which in turn may have multiple corresponding adjoint sources. In embodiments where the multiple output modes have a fixed or predetermined relationship (e.g., a fixed phase difference between the multiple output modes), then the multiple output modes may be combined or otherwise treated as a single output mode for performing the operational and adjoint simulations. In other embodiments (e.g., when there is not a fixed or predetermined relationship between the multiple output modes), the multiple corresponding adjoint sources may each have a corresponding adjoint simulation (e.g., one adjoint simulation per adjoint source) that may be performed in parallel and combined to update the placeholder metric after the operational simulation has completed. In the same or other embodiments, there may also be multiple outputs (e.g., as illustrated by output ports 220 and 225 of FIG. 2A-2B), which results in corresponding adjoint sources (e.g., as illustrated in FIG. 2C). In a manner similar to the above described multiple output mode scenario, the adjoint simulations for each of the adjoint sources may be performed in parallel and combined to update the placeholder metric after the operational simulation has completed. It is further appreciated that in some embodiments there may be multiple outputs and multiple output modes, which may be treated in the previously described manner.

In some embodiments, iterative cycles of performing the operational simulation and adjoint simulation in parallel, updating the loss gradient, determining the structural gradient, and updating the structural parameters to reduce the loss metric are performed successively. An optimization scheme such as gradient descent may be utilized to determine specific amounts or degrees of changes to the structural parameters of the physical device to incrementally reduce the loss metric. More specifically, after each cycle the structural parameters are updated (e.g., optimized) to reduce the loss metric. The operational simulation, adjoint simulation, and updating the structural parameters are iteratively repeated until the loss metric substantially converges or is otherwise below or within a threshold value or range.

Figure 3A:
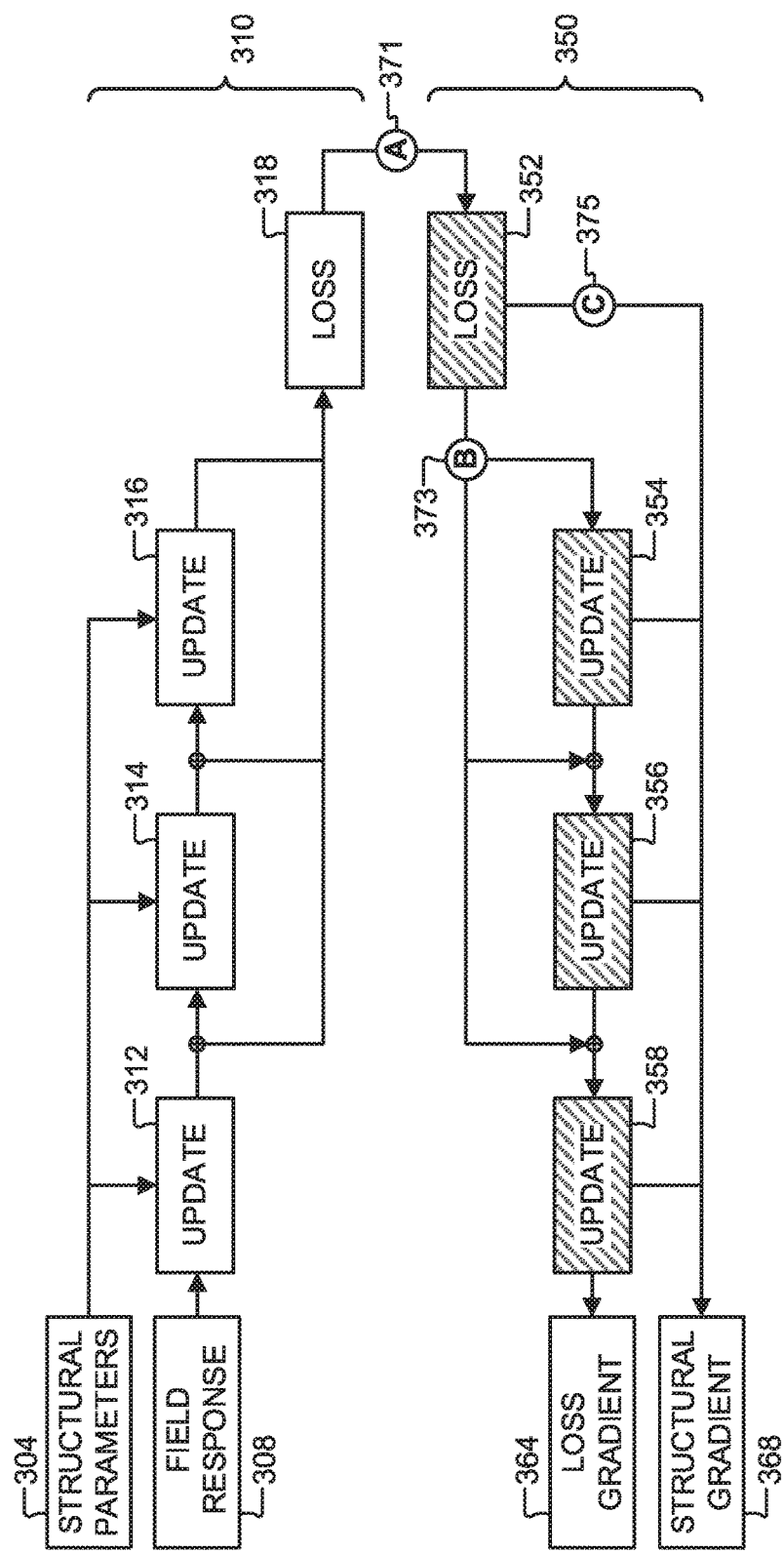
FIG. 3A is a flow chart illustrating example time steps for an operational simulation and adjoint simulation, which may be performed substantially in parallel to reduce computational latency, in accordance with an embodiment of the present disclosure.

FIG. 3A is a flow chart 300 illustrating example time steps for the operational simulation 310 and adjoint simulation 350, which may be performed substantially in parallel to reduce computational latency, in accordance with an embodiment of the present disclosure. Flow chart 300 is one possible implementation that a system (e.g., system 100 of FIG. 1) may use to perform the operational simulation 310 and adjoint simulation 350 of the simulated environment (e.g., simulated environment 201 of FIGS. 2A-2C) describing a physical device (e.g., an electromagnetic or other device). In the illustrated embodiment, the operational simulation utilizes a finite-difference time-domain (FDTD) method to model the field response (both electric and magnetic) or loss response at each of a plurality of voxels (e.g., plurality of voxels 210 illustrated in FIGS. 2A-2C) for a plurality of time steps in response to an excitation source and/or adjoint source. More specifically, the time-dependent Maxwell's equations (in partial differential form) are discretized to solve for field vector components (e.g. the field values for each of the plurality of voxels 210 in simulated environment 201 illustrated by FIGS. 2A-2C that collectively correspond to the field response) over a plurality of time steps.

As illustrated in FIG. 3A, the flow chart 300 includes update operations for a portion of the operational simulation 310 and adjoint simulation 350. The operation simulation 310 occurs over a plurality of time-steps (e.g., from an initial time step to a final time step over a pre-determined or conditional number of time steps having a specified time step size) and models the field response 308 (e.g., changes in electric and magnetic fields of a plurality of voxels describing the simulated environment and/or physical device). More specifically, update operations (e.g., 312, 314, and 316) are iterative and based on the field response 308, structural parameters 304, and an excitation source (not illustrated). Each update operation is succeeded by another update operation, which are representative of successive steps forward in time within the plurality of time steps. For example, update operation 314 updates the field response 308 based on the field response determined from the previous update operation 312 and the structural parameters 304. Similarly, update operation 316 updates the field response 308 based on the field response determined from the update operation 314. In other words, at each time step of the operational simulation the field response is updated based on the previous field response and on the structural parameters of the physical device. It is noted that the field gradient may be determined from the operational simulation 310 (e.g., the change in field response when transitioning from one time step or update operation to another may correspond to the field gradient at a particular time step). Once the final time step of the operational simulation 310 is performed, the loss metric 318 may be determined (e.g., based on a pre-determined loss function). If the adjoint simulation 371 is not being performed in parallel, the loss metric determined from block 318 may proceed via route A 371 in which the initial loss gradient value 352 is determined at the final time step and is backpropagated in reverse (from the final time step incrementally through the plurality of time steps until reaching the initial time step) to determine loss gradient 364 and subsequently structural gradient 368. However, route A 371 does not allow for the simultaneous performance of the operational simulation 310 and adjoint simulation 350, which may result in additional computational cost and/or latency.

Alternatively, loss operational 352 may determine a placeholder metric or value that is representative of the loss metric (before the loss metric is actually calculated). The placeholder metric proceeds through route B 373, in which the placeholder metric is treated as an excitation source (e.g., an adjoint or virtual source) to perform the adjoint simulation 350 by backpropagating (e.g., as in a time-backwards simulation) the placeholder metric through the simulated environment to determine the (interim) loss gradient 364. Once the loss metric 318 from the operational simulation 310 is known, the loss metric 318 is passed through route C 375 to update the structural gradient 368 (e.g., by updating the loss gradient 364 based on the loss metric).

In the illustrated embodiment, the FDTD solve (e.g., operational simulation 310) and backward solve (e.g., adjoint simulation 350) problem are described pictorially, from a high-level, using only "update" and "loss" operations as well as their corresponding gradient operations. The simulation is set up initially in which the structural parameters, excitation source, and initial field states of the simulated environment (and physical device) are provided (e.g., via an initial description and/or input design). As discussed previously, the field values are updated in response to the excitation source based on the structural parameters. More specifically, the update operation is given by $\phi$, where $x_{i+1} = \phi(x_i, b_i, z)$ for $i=1, \ldots, n$. Here, $n$ corresponds to the total number of time steps (e.g., the plurality of time steps) for the operational simulation, where $x_i$ corresponds to the field response (the field value associated with the electric and magnetic fields of each of the plurality of voxels) of the simulated environment at time step $i$, $b_i$ corresponds to the excitation source(s) (the source value associated with the electric and magnetic fields for each of the plurality of voxels) of the simulated environment at time step $i$, and $z$ corresponds to the structural parameters describing the topology and/or material properties of the physical device (e.g., relative permittivity, index of refraction, etc. in the case of an electromagnetic device).

It is noted that using the FDTD method, the update operation may specifically be stated as:

$$\phi(x_i, b_i, z) = A(z) x_i + B(z) b_i. \quad (1)$$

That is to say the FDTD update is linear with respect to the field and source terms. Concretely, $A(z) \in \mathbb{R}^{N \times N}$ and $B(z) \in \mathbb{R}^{N \times N}$ are linear operators which depend on the structure parameters, $z$, and act on the fields, $x_i$, and the sources, $b_i$, respectively. Here, it is assumed that $x_i, b_i \in \mathbb{R}^N$ where N is the number of FDTD field components in the operational simulation. Additionally, the loss operation (e.g., loss function) may be given by $L = f(x_1, \ldots, x_n)$, which takes as input the computed fields and produces a single, real-valued scalar (e.g., the loss metric) that can be reduced and/or minimized.

In terms of optimizing the structural parameters of the physical device, the relevant quantity to produce is $dL/dz$, which is used to describe the influence of changes in the structural parameters on the loss metric and is denoted as the "structural gradient" illustrated in FIG. 3A.

Figure 3B:
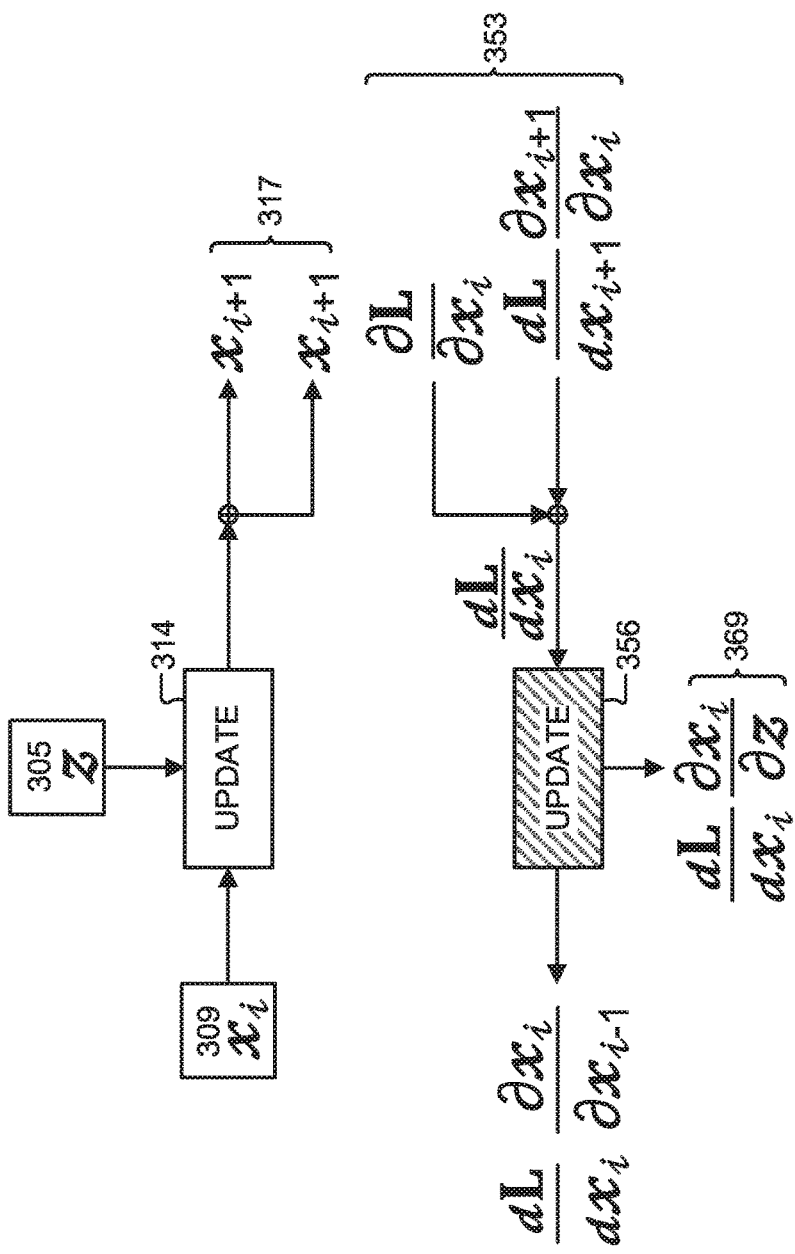
FIG. 3B is a chart illustrating a relationship between an operational simulation and adjoint simulation, in accordance with an embodiment of the present disclosure.

FIG. 3B is a chart 380 illustrating the relationship between the update operation for the operational simulation and the adjoint simulation (e.g., backpropagation), in accordance with an embodiment of the present disclosure. More specifically, FIG. 3B summarizes the operational and adjoint simulation relationships that are involved in computing the structural gradient, dL/dz, which include $$\frac{\partial L}{\partial x_i}, \frac{\partial x_{i+1}}{\partial x_i}, \frac{dL}{dx_i},$$

and $$\frac{\partial x_i}{\partial z}.$$

Advantageously, a placeholder metric is utilized in place of the loss metric such that the operational and adjoint simulations may be performed substantially in parallel. The update operation 314 of the operational simulation updates the field values 309, $x_i$, of the plurality of voxels at the $i$ th time step to the next time step (i.e., $i+1$ time step), which correspond to the field values 317, $x_{i+1}$. A placeholder metric may be utilized to determine stand-in values for the gradients 353 to determine an interim loss gradient, $$\frac{dL}{dx_i},$$

which may be backpropagated through the simulated environment via the adjoint update operation 356. The loss gradient may subsequently be updated based on the loss metric from the operational simulation, which combined with the gradients 369 are used, at least in part, to calculate the structural gradient, $$\frac{dL}{dz} \cdot \frac{\partial L}{\partial x_i}$$

is the contribution of each field to the loss metric, L. It is noted that this is the partial derivative, and therefore does not take into account the causal relationship of $x_i \rightarrow x_{i+1}$. Thus, $$\frac{\partial x_{i+1}}{\partial x_i}$$

is utilized which encompasses the $x_i \rightarrow x_{i+1}$ relationship. The field gradient, $$\frac{dL}{dx_i}$$

may also be used to compute the structural gradient, dL/dz, and corresponds to the total derivative of the field with respect to loss metric, L. The field gradient, $$\frac{dL}{dx_i},$$

at a particular time step, $i$ is equal to the summation of $$\frac{\partial L}{\partial x_i} + \frac{dL}{dx_{i+1}} \frac{\partial x_{i+1}}{\partial x_i}.$$

Finally, $$\frac{\partial x_i}{\partial z}$$

is used which is the contribution to dL/dz from each time/update step.

In particular, the memory footprint to directly compute $$\frac{\partial L}{\partial x_i}$$

and dL/dz is so large that it is intractable to store more than a handful of state Tensors. The state Tensor corresponds to storing the values of all of the FDTD cells (e.g., the plurality of voxels) for a single simulation time step. It is appreciated that the term "tensor" may refer to tensors in a mathematical sense or as described by the TensorFlow framework developed by Alphabet, Inc. In some embodiments the term "tensor" refers to a mathematical tensor which corresponds to a multidimensional array that follows specific transformation laws. However, in most embodiments, the term "tensor" refers to TensorFlow tensors, in which a tensor is described as a generalization of vectors and matrices to potentially higher dimensions (e.g., n-dimensional arrays of base data types), and is not necessarily limited to specific transformation laws. For example, for the general loss function $f$, it may be necessary to store the fields, $x_i$, for all time steps, $i$. This is because, for most choices of $f$, the gradient will be a function of the arguments of $f$. This difficulty is compounded by the fact that the values of $$\frac{\partial L}{\partial x_i}$$

for larger values of $i$ are needed before the values for smaller $i$ due to the incremental updates of the field response and/or through backpropagation of the loss metric, which may prevent the use of schemes that attempt to store only the values $$\frac{\partial L}{\partial x_i},$$

at an immediate time step.

An additional difficulty in performing the backpropagation without a reduced representation is further illustrated when computing the structural gradient, dL/dz, which is given by:

$$\frac{dL}{dz} = \sum_i \frac{dL}{dx_i} \frac{\partial x_i}{\partial z}. \quad (2)$$

For completeness, the full form of the first term in the sum, dL/dz, is expressed as:

$$\frac{dL}{dx_i} = \frac{\partial L}{\partial x_i} + \frac{dL}{dx_{i+1}} \frac{\partial x_{i+1}}{\partial x_i}. \quad (3)$$

Based on the definition of ϕ as described by equation (1), it is noted that $$\frac{\partial x_{i+1}}{\partial x_i} = A(z),$$

which can be substituted in equation (3) to arrive at an adjoint update for backpropagation (e.g., the update operations such as update operation 356), which can be expressed as:

$$\frac{dL}{dx_i} = \frac{\partial L}{\partial x_i} + \frac{dL}{dx_{i+1}} A(z), \text{ or} \quad (4)$$

$$\nabla_{x_i} L = A(z)^T \nabla_{x_{i+1}} L + \frac{\partial L^T}{\partial x_i}. \quad (5)$$

The adjoint update is the backpropagation of the loss gradient (e.g., from the placeholder metric) from later to earlier time steps and may be referred to as a backwards solve for $$\frac{dL}{dx_i}.$$

More specifically, the loss gradient may initially be based upon the backpropagation of a placeholder metric and subsequently the loss gradient may be updated once the loss metric from the operational simulation is determined. The second term in the sum, $$\frac{dx_i}{dz},$$

corresponds to the field gradient and is denoted as:

$$\frac{\partial x_i}{\partial z} = \frac{d\phi(x_{i-1}, b_{i-1}, z)}{dz} = \frac{dA(z)}{dz}x_{i-1} + \frac{dB(z)}{dz}b_{i-1}, \quad (6)$$

for the particular form of $\phi$ described by equation (1). Thus, without reduced representation, each term of the sum associated with dL/dz depends on both $$\frac{dL}{dx_{i_0}} \text{ for } i >= i_0$$

and $x_{i_0}$ for $i < i_0$. Since the dependency chains of these two terms are in opposite directions, it is concluded that computing dL/dz in this way (e.g., without reduced representation) also requires the storage of $x_i$ values for all of $i$ which is assumed to be intractable.

It is noted that $$\frac{\partial x_i}{\partial z}$$

is linear with respect to $x_{i-1}$ and $b$ which is a direct consequence of the linearity of $\phi$ with respect to $x_i$ and $b_i$. This linearity will be leveraged to compute $$\frac{\partial L}{\partial x_i} \text{ and } \frac{dL}{dz}$$

with a reduced memory footprint and in a manner to allow for simultaneous performance of the operational and adjoint simulations by restricting $f$ of the loss function to a specific set of functions and representing the field response (and subsequently the loss gradient) with reduced dimensionality.

To compute $$\frac{\partial L}{\partial x_i}$$

without storing $x_i$ values for all of $i$ the generic loss function $f(x_i, \ldots, x_n)$ of the loss operation L is restricted to the set of functions where:

$$f(x_i, \ldots, x_n) = f(u_i(x_i), \ldots, u_n(x_n)), \quad (7)$$

where $u_i$ is low-dimensional to allow for the arbitrarily complex function, $f$, which is dependent on the field response of the plurality of voxels at each of the plurality of time steps, to remain tractable. In other words, the loss function is a function of a low rank function (e.g., $u_i(x_i)$), on the field values, such that the loss gradient will also be low rank and thus tractable, which enables storage of the loss gradient (and subsequently the structural gradient). In other words, the low rank function produces an output that is low rank, and thus tractable. A generalization of a low rank function may correspond to a function in which the output depends on the input and a small number (e.g., hundreds or less) of other vectors of comparable size with respect to the input. More concretely, "low-rank" may be a relative term described in relation to "full-rank." In this case, a full-rank function may be of order N (e.g., where N is the number of voxels in the simulated environment and may typically include billions of real-world simulations). Thus, a low-rank function may be described as having an output that is based on the input and a less than N (e.g., less than the entire scope of the simulated environment) number of other vectors (e.g., related to a pre-determined number of the voxels, rather than all voxels in the simulated environment). A low rank output may be achieved in a variety of ways (e.g., singular value decomposition), that are described in embodiments of the disclosure. Additionally, for storage of the loss gradient to remain tractable, the adjoint (e.g., backpropagation) operation, which corresponds to $$\frac{df}{dx_i} = \frac{df}{du_i}\frac{du_t}{dx_i},$$

is efficient such that one can multiply the loss gradient (here, incorporated within the gradient of the generic loss function $f$; represented by $$\frac{df}{du_i})$$

by $$\frac{du_i}{dx_i}$$

efficiently. Advantageously, the simplified output of $u_i$ may be safely inserted into the arbitrarily complex loss function $f$ while remaining tractable (i.e., being protected from memory footprint issues, since storing $x_i$ values for all values of $i$ is not necessary).

In one embodiment, a constant u is chosen for all $x_i$, such as $u_i(x_i) = c^T x_i$, where $x_i \in \mathbb{R}^m$ represents the fields at time step $i$ and $c \in \mathbb{R}^{m \times p}$, and $p \ll m$. In other words, the dot product between $c^T$ and $x_i$ produces a single scalar that describes the field response at a particular time step, which may be saved along $c^T$ to recover the field response at the particular time step. In other words, the field response may be stored as a reduced representation. Furthermore, such a choice for u is tractable since the derivative of $u_i$ with respect to $x_i$ is c, which is efficient since it only involves the storage of the constant c instead of needing to store all $x_i$ states. Intuitively, restricting the loss function to a plurality of low rank functions applied on top of the respective field response for each of the plurality of time steps may be thought of as a modal decomposition of the field response into p output modes of interest, which may be achieved via eigenvalue decomposition, singular value decomposition, proper orthogonal decomposition, principal component analysis, and the like.

In another embodiment the generic loss function $f(x_i, \ldots, x_n)$ of the loss operation L is restricted to a single function, u, that is chosen across the field response, $x_i$, for the plurality of time steps such that $f(x_1, \ldots, x_n) = f(u(x_1, \ldots, x_n))$, where $$(x_1, \ldots, x_n) = \sum_i c_i^T x_i \in \mathbb{R}^{m \times p},$$

and p<K m. As compared to the embodiment in which a plurality of low rank functions, u, is chosen respectively for each of the plurality of time steps, this embodiment is even more restrictive in the sense that the expected time variation is already determined by u (although there is some flexibility possible while still preserving memory efficiency, such as allowing for an arbitrary time delay). What is particularly poignant about this embodiment is that the gradient $$\frac{df}{dx_i}$$

across all $x_i$ can be determined a priori, before even performing the simulation. In other words, the loss gradient may be determined based on a placeholder metric, which may subsequently be updated once the loss metric from the operational simulation is known. Advantageously, this allows for both the operational simulation and the adjoint simulation to proceed in parallel. The final structural gradient dL/dz then may be arrived at by combining the field gradient from the operational simulation and the loss gradient from the adjoint simulation in the appropriate way.

More specifically, instead of the loss function depending on the field response at each of the plurality of time steps, a mode overlap integral may be calculated at every time step that is representative of the field response. In other words, the loss function is computed on top of the mode overlap integral such that the field response may be represented by a single scalar for each of the plurality of time steps. In some embodiments, the mode overlap integral involves determining the overlap between input electromagnetic field (e.g., $E_x$, $E_y$, $E_z$, $H_x$, $H_y$, and $H_z$ fields of one or more voxels within the simulated environment) as well as the electromagnetic fields (e.g., electric and magnetic fields in the x, y, and z directions) of a specific electromagnetic mode (e.g., transverse mode or other modes which may be described as different eigenfunctions of the solutions to the electromagnetic wave equation given specific boundary conditions). More specifically, the mode overlap integral involves multiplying the individual field values of the input (e.g., of a given voxel) with those of the electromagnetic mode, which is followed by summing the result. It is noted that each scalar may also include a complex component as well. For example, the field response for each of a million time steps included in the plurality of time steps may include field values for a million voxels. Rather than store the field response (e.g., the field values for each of the plurality of voxels) at each of the plurality of time steps, the mode overlap integral may be computed for each of the plurality of time steps, which results in a single scalar for each of the plurality of times (e.g., a million scalars to represent the field response over the million time steps). Then, in one embodiment, while backpropagating the loss metric to determine the loss gradient, the desired field gradient may be backed out for every time step based, at least in part, on the scalar for the desired time steps and the corresponding mode used to perform the mode overlap.

In order to allow for the performance of both the operational simulation and adjoint simulation in parallel an additional step may be utilized. For example, assume a simulation (e.g., operational simulation) includes values (xx, yy, zz, tt), where the field values are described by xx, yy, zz and the plurality of time steps correspond to tt. The field response (xx, yy, zz) over each the plurality of time steps (tt) may be represented by a function, u(t), which at a particular value for t is representative of the field response (xx, yy, zz). Thus, during the operational simulation a mode, c, is chosen and the mode overlap integral is performed to determine a representation of the field response entity (xx, yy, zz) at a particular time step. In some embodiments, the mode overlap corresponds to the inner product between the mode c and the function u at each of the plurality of time steps (i.e., $c^T \cdot (t)$). The loss function is then some arbitrary (e.g., predetermined) loss function, $f$, on top of the mode overlap such as $f(c^T u(t))$, which is tractable, because the gradient of the loss function with respect to u (e.g., a variant or modification of the loss gradient) simplifies as follows:

$$\frac{d(\text{loss function})}{du(t)} = \frac{df}{dc^T u(t)} \frac{dc^T u(t)}{u(t)} = \frac{df}{dc^T u} c^T, \tag{8}$$

as determined from the chain rule.

Such a simplification may be utilized for simultaneous performance of the operational simulation and adjoint simulation. As described above, we showed that the field response may be stored as a reduced representation via a mode overlap integral, in which the same modal overlap with the field response at every time step is computed and placed in a vector as follows:

$$\begin{bmatrix} c^T u(0) \\ c^T u(1) \\ c^T u(2) \\ \vdots \\ c^T u(n) \end{bmatrix} = m. \tag{9}$$

Furthermore, the loss function is a function, $f$, of the vector m. This can be further simplified by constructing a vector, ũ, which includes the values of (0), (1), . . . , u(n) for the plurality of time steps. Another vector is constructed, č, which includes the mode overlap (e.g., c(0), c(1), etc.) for every time step. Then a value, m, is defined as the inner product between the č and ũ (e.g., $č^T ũ$). The loss function is then defined as an arbitrary function, g, over m̃ (e.g., loss=g(m̃)). The gradient of the loss function (e.g., loss gradient) will then correspond to $$\frac{dL}{dũ},$$

which is equal to $$\left(\frac{dL}{df}\right)\tilde{e}^T.$$

Advantageously, (dL/df) is a scalar. In other words, the loss gradient may be determined before the loss metric from the operational simulation is known. Then, once the loss metric is known, the loss gradient may be updated based on the scalar representation of (dL/df). Thus, while doing the operational simulation, the value of dL/df is set to a placeholder metric (e.g., one, a guess, a random number, or the like). The placeholder metric is backpropagated through the simulated environment to determine the (interim) loss gradient. Once the actual value for dL/df is known from the operational simulation the loss gradient is updated by the scalar. In other words, reducing the computational dependency of the adjoint simulation on the results of the operational simulation allows for the operational simulation and adjoint simulation to be performed in parallel, which depending on the available computational resources may reduce the computational latency by fifty percent.

Figure 4:
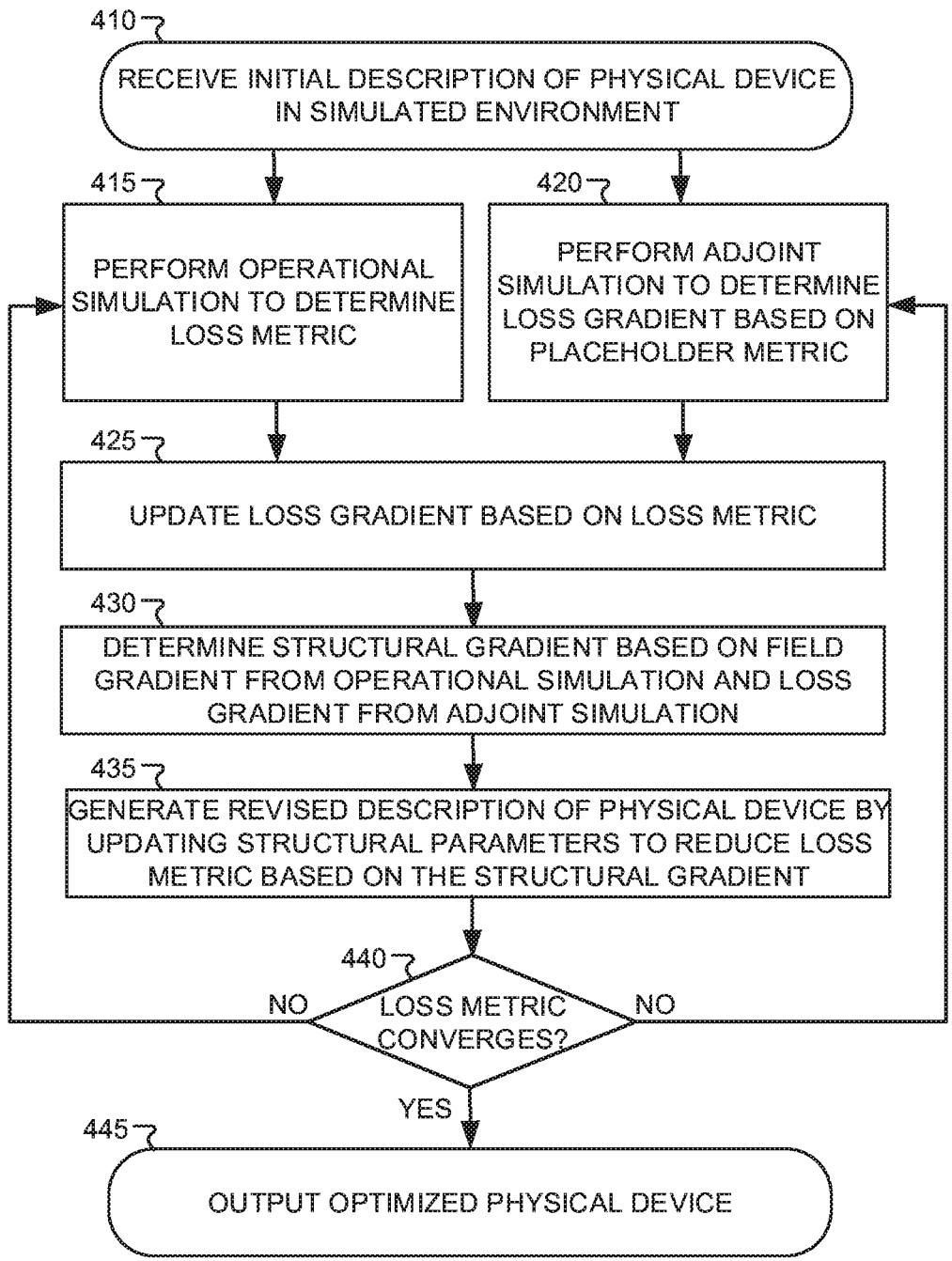
FIG. 4 illustrates a method for optimizing structural parameters of a physical device with reduced computational latency, in accordance with an embodiment of the present disclosure.

FIG. 4 illustrates a method 400 for optimizing structural parameters of a physical device with reduced computational latency, in accordance with an embodiment of the present disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

Block 410 illustrates receiving (or otherwise obtaining) an initial description of the physical device (e.g., an electromagnetic device) that describes structural parameters of the physical device within a simulated environment. The simulated environment may include a plurality of voxels that collectively describe the structural parameters of physical device. Each of the plurality of voxels is associated with a structural value to describe the structural parameters, a field value to describe the field response (e.g., the electric and magnetic fields in one or more orthogonal directions) to an excitation source, and a source value to describe the excitation source. In one embodiment, the simulated environment includes a design region that includes a portion of the plurality of voxels which have structural parameters that may be updated, revised, or otherwise changed to optimize the structural parameters of the physical device. In the same or other embodiments, the structural parameters are associated with geometric boundaries and/or material compositions of the physical device based on the material properties (e.g., relative permittivity, index of refraction, etc.) of the simulated environment.

Block 415 shows performing an operational simulation of the physical device operating in response to an excitation source to determine a performance metric of the physical device. More specifically, a loss metric corresponding to a difference between the performance metric and a target performance metric may be computed for determining a structural gradient of the simulated environment. A partial differential equation system is utilized to simulate the field response over a plurality of time steps in which the excitation source is influencing the field values of the field response. The field values for each of the plurality of voxels are incrementally updated over the plurality of time steps to perform the operational simulation. The field values of the plurality of voxels are updated in response to an output of the excitation source and based, at least in part, on the structural parameters of the physical device. Additionally, each update operation at a particular time step may also be based, at least in part, on a previous (e.g., immediately prior) time step. In some embodiments, the field response at an arbitrary one of the plurality of time steps is linearly related with respect to a field value and a source value at an immediately prior time step included in the plurality of time steps.

In some embodiments, the field response may be stored in a reduced representation (e.g., via a low rank approximation) in which a modal decomposition of the field response into one or more output modes of interest are stored. In the same or other embodiments, a mode overlap of the field response for the plurality of time steps at the one or more output modes of interest is calculated to reduce a rank of the field response (tensor) determined from the operational simulation. In some embodiments, each of the plurality of time steps is associated with a respective scalar value that collectively represent the mode overlap of the field response at the one or more modes of interest (e.g., inner product between the modes of interest and a low rank approximation of the field response at each of the plurality of time steps). In the same or other embodiments, the field gradient representative of an influence of changes in the field response with respect to the structural parameters is calculated based on the operational simulation of the physical device over the plurality of time steps.

Block 420 illustrates performing an adjoint simulation to determine a loss gradient based on a placeholder metric. More specifically, the placeholder metric is backpropagated incrementally from a final time step to earlier time steps in the plurality of time steps until reaching an initial time step included in the plurality of time steps to determine the loss gradient. The loss gradient is representative of an influence of changes in the loss metric with respect to changes in a low rank approximation of the field response. More specifically, the backpropagation of the placeholder metric provides an interim loss gradient, which may be subsequently updated once the loss metric is known. Explicitly, the loss gradient is determined from a loss function. In some embodiments, the loss function is associated with a low rank approximation of the field response (e.g., modal decomposition) of the simulated environment for each of the plurality of time steps. Advantageously, by utilizing the placeholder metric, the operational simulation and adjoint simulations may be performed concurrently.

During the adjoint simulation, the placeholder metric is treated as an adjoint (or virtual) source and a simulation is performed to backpropagate the placeholder metric through the simulated environment to eventually determine the structural gradient. The structural gradient corresponds to the influence (i.e., sensitivity) of changes of the structural parameters of the physical device to the loss metric. Backwards propagation of error (i.e., backpropagation) may require the field value or field response at particular time steps and points (e.g., temporally and/or spatially) within the simulated environment from the operational simulation. However, by using the placeholder metric the backpropagation may be completed to determine the (interim) loss gradient. In some embodiments, when performing the adjoint simulation, a change in the field response is incrementally updated over the plurality of time steps for each of the plurality of voxels from an initial position at the spatial position of the loss metric (i.e., output ports of the optical waveguide). In other words, the adjoint simulation may be referred to as a backwards solve and appear to be a simulation of the placeholder metric backwards in time.

Block 425 shows updating the loss gradient based on a loss metric. In other words, once the loss metric is known, the value for dL/df may be determined, which may correspond to a scalar for each of the plurality of time steps that is utilized to update the loss gradient.

Block 430 illustrates determining a structural gradient based on the field gradient from the operational simulation and the loss gradient from the adjoint simulation. The structural gradient corresponds to the influence of changes in the structural parameters on the loss metric. In other words, the structural gradient may be utilized to determine how changes in the structural parameters of specific voxels influence the loss metric.

Block 435 shows generating a revised description of the physical device by updating the structural parameters to reduce the loss metric. In some embodiments, the revised description is generated by utilizing an optimization scheme after a cycle of operational and adjoint simulations via a gradient descent algorithm. Put in another way, iterative cycles of simulating the physical device (e.g., operational simulation), backpropagating a placeholder metric (e.g., adjoint simulation), updating the loss gradient based on the loss metric, determining the structural gradient, and updating the structural parameters to reduce the loss metric may be performed until the loss metric substantially converges in accordance with the optimization scheme.

Block 440 illustrates determining whether the loss metric substantially converges such that the difference between the performance metric and the target performance metric is within a threshold range or value. In some embodiments, the term "converges" may simply indicate the difference between the performance metric and the target performance metric is within the threshold range and/or below some threshold value. If the loss metric has not converged, block 440 proceeds to block 415/420 and the process continues. If the loss metric has converged, block 440 proceeds to block 445. In other words, iterative cycles of successively performing the operational simulation, performing the backpropagation of the loss metric (e.g., adjoint simulation), and adjusting or otherwise updating the structural parameters (e.g., optimization) to reduce the loss metric are performed repeatedly until the loss metric is reduced to result in a difference between the performance metric and the target performance metric to be within the threshold range.

Block 445 illustrates outputting an optimized electromagnetic device in which the structural parameters have been updated to have the difference between the performance metric and the target performance metric within a threshold range.

Figure 5:
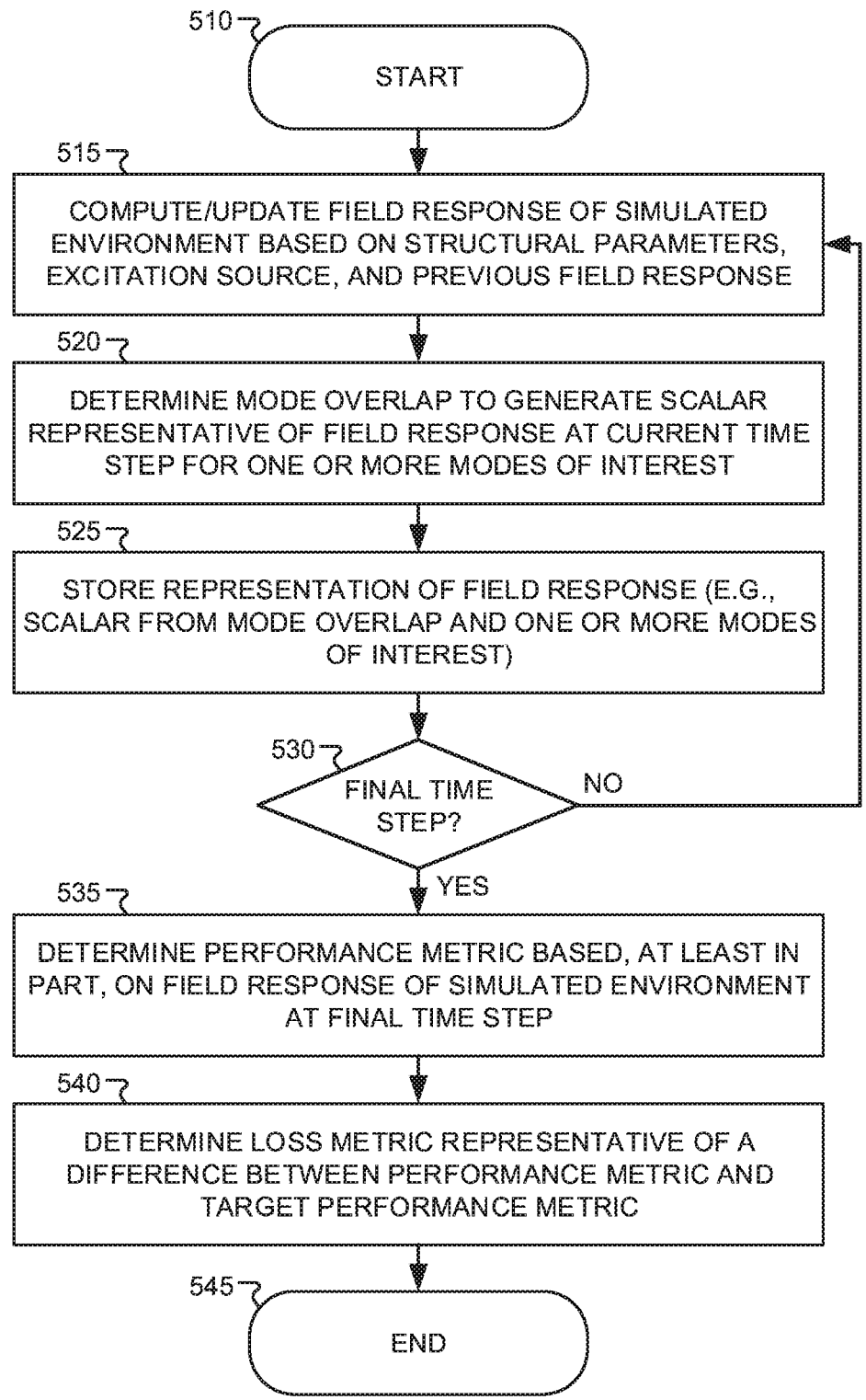
FIG. 5 illustrates a method for performing an operational simulation of a physical device within a simulated environment, in accordance with an embodiment of the present disclosure.

FIG. 5 illustrates a method 500 for performing an operational simulation of a physical device within a simulated environment, in accordance with an embodiment of the present disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

Block 510 illustrates an initialization of the operational simulation (e.g., based on the initial description or revised description of the physical device and/or simulated environment, excitation source, and the like).

Block 515 shows computing or updating the field response of the simulated environment (e.g., field values of each of the plurality of voxels) based, at least in part, on the structural parameters of the physical device, the excitation source, and the previous field response (if the time step does not correspond to an initial time step). The field response may be determined based on first-principles operations in which a partial differential system discretizes Maxwell's equations for solving (e.g., simulating) the field response.

Block 520 illustrates determining a mode overlap integral to generate a scalar representative of the field response at the current time step for one or more modes of interest. More specifically, the scalar may be representative of the inner product between a low rank approximation of the field and the overlap mode. In other embodiments, a modal decomposition of the field response at the current time step may be determined via the mode overlap integral.

Block 525 illustrates storing the representation of the field response (e.g., the scalar from the mode overlap and one or more modes of interest). The values may be stored (e.g., in memory) for later utilization (e.g., to determine the updated loss gradient and/or structural gradient).

Block 530 checks to see if the final time step has been reached. If not, block 530 proceeds to block 515 in which the next time step is performed to update the field response. If the final time step in the plurality of time steps is reached, block 530 proceeds to block 535. In some embodiments, the final time step may be a conditional time step (e.g., changes to the field response with respect to time reduce such that the field response substantially stabilizes). In other embodiments, the number of time steps is a pre-determined value.

Block 535 shows determining a performance metric based, at least in part, on the field response of the simulated environment at the final time step. The performance metric may correspond to the power of the physical device (e.g., at one or more output ports).

Block 540 illustrates determining a loss metric representative of a difference between the performance metric and a target performance metric. Once the loss metric is determined the operational simulation is complete as indicated by block 545.

Figure 6:
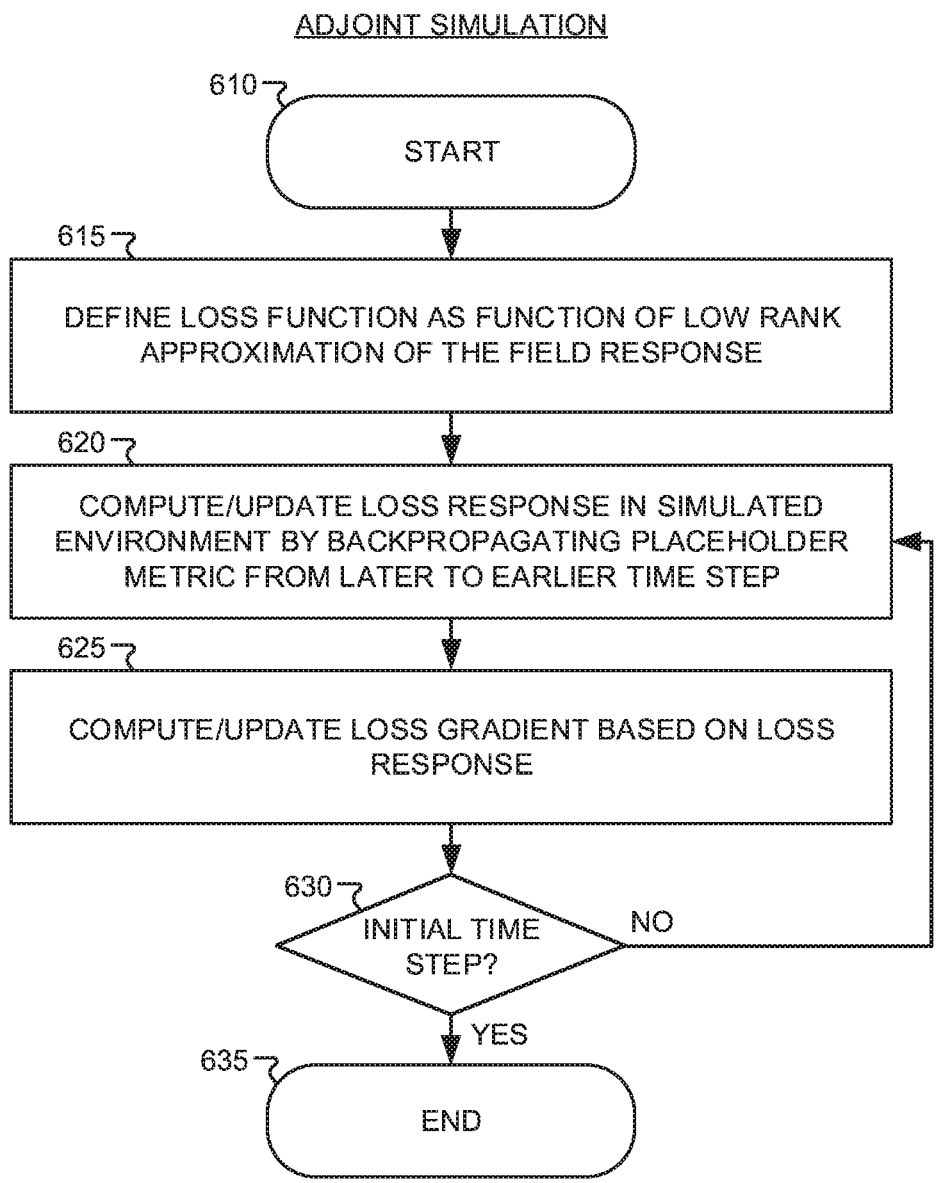
FIG. 6 illustrates a method for performing an adjoint simulation of a physical device within a simulated environment, in accordance with an embodiment of the present disclosure.

FIG. 6 illustrates a method 600 for performing an adjoint simulation of the physical device within a simulation environment, in accordance with an embodiment of the present disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

Block 610 shows an initialization of the adjoint simulation, which may be based on the initial description or revised description of the physical device (e.g., structural parameters, excitation source, and the like). More specifically, a placeholder metric may be chosen (e.g., arbitrarily, conditionally, or otherwise determined).

Block 615 illustrates defining a loss function as a function of a low rank approximation (e.g., modal decomposition) of the field response, which the adjoint simulation may be computed in absence of a known loss metric.

Block 620 illustrates computing or updating a loss response in a simulated environment by backpropagating the placeholder metric from later to earlier time steps (e.g., starting from the final time step and proceeding incrementally to earlier time steps). More specifically, the placeholder metric may be treated as an adjoint or virtual source that is simulated to determine the loss response at each of the plurality of voxels that collectively correspond to the loss gradient.

Block 625 shows computing or otherwise updating the loss gradient based on the loss response. More specifically, the loss gradient is a collective representative of the loss response at each of the plurality of voxels.

Block 630 checks to see if the initial time step has been reached. If the initial time step has not been reached, block 630 proceeds to block 620 in which the loss response for an earlier time step is computed and the loss gradient is subsequently updated. Once the initial time step is reached, block 630 proceeds to block 635 which indicates the adjoint simulation is completed. It is noted that the loss gradient may be stored in a tractable manner because the loss function has been defined based on a low rank approximation of the field response. In other words, since storing the field response is tractable, then storing the loss gradient, which depends on the field response (or in this case the placeholder metric) is also tractable.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for optimizing structural parameters of a physical device, the method comprising:
   receiving an initial description of the physical device that describes the structural parameters of the physical device within a simulated environment;
   performing an operational simulation of the physical device within the simulated environment in response to an excitation source to determine a performance metric of the physical device;
   performing an adjoint simulation by backpropagating a placeholder metric through the simulated environment to determine a loss gradient;
   updating the loss gradient, determined from the adjoint simulation with the placeholder metric, based, at least in part, on a loss metric, wherein the loss metric is based on a difference between the performance metric, determined from the operational simulation, and a target performance metric of the physical device;
   computing a structural gradient based, at least in part, on the loss gradient, wherein the structural gradient corresponds to an influence of changes in the structural parameters on the loss metric; and
   generating a revised description of the physical device by updating the structural parameters based on the structural gradient to reduce the loss metric.

2. The computer-implemented method of claim 1, wherein the placeholder metric is pre-determined before a completion of the operational simulation to reduce a dependency of the adjoint simulation on the operational simulation, and wherein the operational simulation and the adjoint simulation are performed substantially in parallel.

3. The computer implemented method of claim 2, wherein the placeholder metric corresponds to at least one of a random value, a guess based on a previous value of the loss metric, or a set value.

4. The computer-implemented method of claim 2, wherein the loss gradient, determined from the adjoint simulation with the placeholder metric, is updated by scaling the loss gradient based on the loss metric, and wherein the placeholder metric corresponds to a placeholder value for the loss metric.

5. The computer-implemented method of claim 1, wherein performing the operational simulation further comprises:
   determining a field response of the simulated environment for a plurality of time steps based, at least in part, on the structural parameters and the excitation source, wherein the performance metric is based on the field response at a final time step included in the plurality of time steps.

6. The computer-implemented method of claim 5, wherein the loss gradient is determined from a loss function, wherein the loss function is associated with a low rank approximation of the field response of the simulated environment for each of the plurality of time steps, and wherein the low rank approximation of the field response corresponds to a reduced rank representation of the field response relative to a full-rank representation of the field response.

7. The computer-implemented method of claim 6, wherein the low rank approximation of the field response corresponds to a modal decomposition of the field response into one or more output modes of interest.

8. The computer-implemented method of claim 7, wherein performing the operational simulation further comprises:
   calculating a mode overlap of the field response for the plurality of time steps at the one or more output modes of interest to reduce a rank of the field response of the operational simulation.

9. The computer-implemented method of claim 8, wherein each of the plurality of time steps is associated with a scalar value that collectively represent the mode overlap of the field response at the one or more output modes of interest.

10. The computer-implemented method of claim 8, wherein the mode overlap is calculated, at least in part, by determining an inner product between the one or more output modes of interest and the low rank approximation of the field response at each of the plurality of time steps.

11. The computer-implemented method of claim 5, where performing the adjoint simulation further comprises:
  backpropagating the placeholder metric incrementally from the final time step to earlier time steps included in the plurality of time steps until reaching an initial time step included in the plurality of time steps to determine the loss gradient, wherein the loss gradient is representative of an influence of changes in the loss metric with respect to changes in a low rank approximation of the field response, and wherein the low rank approximation of the field response corresponds to a reduced rank representation of the field response relative to a full-rank representation of the field response.

12. The computer-implemented method of claim 10, further comprising:
  determining a field gradient representative of an influence of changes in the field response with respect to the structural parameters based on the operational simulation of the physical device over the plurality of time steps; and
  determining the structural gradient based, at least in part, on the loss gradient, which has been updated after completion of the operational simulation and adjoint simulation, and the field gradient.

13. At least one non-transitory machine-accessible storage medium that provides instructions that, when executed by a machine, will cause the machine to perform operations comprising:
  receiving an initial description of a physical device that describes structural parameters of the physical device within a simulated environment;
  performing an operational simulation of the physical device within the simulated environment in response to an excitation source to determine a performance metric of the physical device;
  performing an adjoint simulation by backpropagating a placeholder metric through the simulated environment to determine a loss gradient;
  updating the loss gradient, determined from the adjoint simulation with the placeholder metric, based, at least in part, on a loss metric, wherein the loss metric is based on a difference between the performance metric, determined from the operational simulation, and a target performance metric of the physical device;
  computing a structural gradient based, at least in part, on the loss gradient, wherein the structural gradient corresponds to an influence of changes in the structural parameters on the loss metric; and
  generating a revised description of the physical device by updating the structural parameters based on the structural gradient to reduce the loss metric.

14. The at least one non-transitory machine-accessible storage medium of claim 13, wherein the instructions, when executed by the machine, will cause the operational simulation and the adjoint simulation to be performed substantially in parallel, and wherein the placeholder metric is pre-determined before a completion of the operational simulation to reduce a dependency of the adjoint simulation on the operational simulation.

15. The at least one non-transitory machine-accessible storage medium of claim 14, wherein the loss gradient, determined from the adjoint simulation with the placeholder metric, is updated by scaling the loss gradient based on the loss metric, and wherein the placeholder metric corresponds to a placeholder value for the loss metric.

16. The at least one non-transitory machine-accessible storage medium of claim 14, wherein the placeholder metric corresponds to at least one of a random value, a guess based on a previous value of the loss metric, or a set value.

17. The at least one non-transitory machine-accessible storage medium of claim 13, providing additional instructions that, when executed by the machine, will cause the machine to perform further operations, comprising:
  determining a field response of the simulated environment for a plurality of time steps based, at least in part, on the structural parameters and the excitation source, wherein the performance metric is based on the field response at a final time step included in the plurality of time steps.

18. The at least one non-transitory machine-accessible storage medium of claim 17, wherein the loss gradient is determined from a loss function, wherein the loss function is associated with a low rank approximation of the field response of the simulated environment for each of the plurality of time steps, and wherein the low rank approximation of the field response corresponds to a reduced rank representation of the field response relative to a full-rank representation of the field response.

19. The at least one non-transitory machine-accessible storage medium of claim 18, wherein the low rank approximation of the field response corresponds to a modal decomposition of the field response into one or more output modes of interest.

20. The at least one non-transitory machine-accessible storage medium of claim 19, providing additional instructions that, when executed by the machine, will cause the machine to perform further operations, comprising:
  calculating a mode overlap of the field response for the plurality of time steps at the one or more output modes of interest to reduce a rank of the field response of the operational simulation.

21. The at least one non-transitory machine-accessible storage medium of claim 20, wherein each of the plurality of time steps is associated with a scalar value that collectively represent the mode overlap of the field response at the one or more output modes of interest.

22. The at least one non-transitory machine-accessible storage medium of claim 20, wherein the mode overlap is calculated, at least in part, by determining an inner product between the one or more output modes of interest and the low rank approximation of the field response at each of the plurality of time steps.

23. The at least one non-transitory machine-accessible storage medium of claim 17, where performing the adjoint simulation further comprises:
  backpropagating the placeholder metric incrementally from the final time step to earlier time steps included in the plurality of time steps until reaching an initial time step included in the plurality of time steps to determine the loss gradient, wherein the loss gradient is representative of an influence of changes in the loss metric with respect to changes in a low rank approximation of the field response, and wherein the low rank approximation of the field response corresponds to a reduced rank representation of the field response relative to a full-rank representation of the field response.

24. The at least one non-transitory machine-accessible storage medium of claim 23, providing additional instructions that, when executed by the machine, will cause the machine to perform further operations, comprising:
  determining a field gradient representative of an influence of changes in the field response with respect to the structural parameters based on the operational simulation of the physical device over the plurality of time steps; and determining the structural gradient based, at least in part, on the loss gradient, which has been updated after completion of the operational simulation and adjoint simulation, and the field gradient.

* * * * *